(12) United States Patent
Yanase

(10) Patent No.: US 9,057,611 B2
(45) Date of Patent: Jun. 16, 2015

(54) ROUTE INFORMATION PROVIDING DEVICE, ROUTE INFORMATION PROVIDING METHOD, PROGRAM, AND INFORMATION RECORDING MEDIUM

(75) Inventor: Naohiro Yanase, Tokyo (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/634,982

(22) PCT Filed: Nov. 7, 2011

(86) PCT No.: PCT/JP2011/075625
§ 371 (c)(1),
(2), (4) Date: Dec. 26, 2012

(87) PCT Pub. No.: WO2012/101887
PCT Pub. Date: Aug. 2, 2012

(65) Prior Publication Data
US 2013/0103311 A1    Apr. 25, 2013

(30) Foreign Application Priority Data
Jan. 28, 2011   (JP) .................................. 2011-016633

(51) Int. Cl.
*G01C 21/00*   (2006.01)
*G01C 21/34*   (2006.01)
(Continued)

(52) U.S. Cl.
CPC ............ *G01C 21/00* (2013.01); *G01C 21/3484* (2013.01); *G01C 21/3453* (2013.01);
(Continued)

(58) Field of Classification Search
CPC ............... G01C 21/3484; G01C 21/00; G01C 21/3676; G01C 21/3641; G01C 21/3453; G08G 1/096838; G08G 1/096816; G08G 1/005

USPC .................................. 701/527, 532, 533, 433
See application file for complete search history.

(56) References Cited

U.S. PATENT DOCUMENTS 5,646,856 A * 7/1997 Kaesser ......................... 701/532
5,787,233 A * 7/1998 Akimoto ......................... 706/45
(Continued)

FOREIGN PATENT DOCUMENTS

DE     102 03 097 A1    8/2003
EP     2 037 219 A1     3/2009
(Continued)

OTHER PUBLICATIONS

Japanese Office Action issued Mar. 13, 2013 in corresponding Japanese Patent Application No. 2012-503568.
(Continued)

*Primary Examiner* — Helal A Algahaim
*Assistant Examiner* — Genna Mott
(74) *Attorney, Agent, or Firm* — Sughrue Mion, PLLC

(57) ABSTRACT

In order to make a user intuitively recognize labor of traveling on a route, a map information providing server (10) stores map data including an undulation of an actual topography, stores information on first routes each containing one or more routes from a point, as a start point, corresponding to information on the user in the map data, to a plurality of predetermined points in a region containing the point corresponding to the information on the user in the map data, in association with identification information on the user, determines a second route from a start point to an endpoint specified based on a request from the user, directly or indirectly compares a length of the second route and an undulation on the second route, and a length of each of the first routes and an undulation on each of the first routes with each other in the map data, and provides the user with information on a comparison result.

15 Claims, 16 Drawing Sheets

(51) Int. Cl.
*G08G 1/005* (2006.01)
*G08G 1/0968* (2006.01)
*G01C 21/36* (2006.01)

(52) U.S. Cl.
CPC .......... G08G1/005 (2013.01); G08G 1/096816 (2013.01); G08G 1/096838 (2013.01); G01C 21/3676 (2013.01)

(56) References Cited

U.S. PATENT DOCUMENTS

| | | | | |
|---|---|---|---|---|
| 7,158,876 | B2* | 1/2007 | Crook | 701/533 |
| 2005/0071078 | A1* | 3/2005 | Yamada et al. | 701/201 |
| 2005/0159889 | A1* | 7/2005 | Isaac | 701/210 |
| 2008/0195313 | A1* | 8/2008 | Coleman | 701/210 |
| 2008/0270016 | A1* | 10/2008 | Proietty et al. | 701/123 |
| 2009/0043498 | A1* | 2/2009 | Maethner | 701/209 |
| 2009/0088962 | A1* | 4/2009 | Jones | 701/200 |
| 2010/0010732 | A1* | 1/2010 | Hartman | 701/200 |

FOREIGN PATENT DOCUMENTS

| | | | |
|---|---|---|---|
| EP | 2172249 | A2 * | 4/2010 |
| JP | 9-101160 | A | 4/1997 |
| JP | 2010-134887 | A | 6/2010 |
| JP | 2010-160166 | A | 7/2010 |

OTHER PUBLICATIONS

International Preliminary Report on Patentability and English Translation of the Written Opinion of the International Searching Authority for PCT/JP2011/075625 mailed on Aug. 8, 2013.
Supplementary European Search Report for Application No. EP 11 85 6882 dated Mar. 4, 2014.

* cited by examiner

FIG.4

| θ | F |
|---|---|
| ∼ −45° | $f_m$ |
| −45° ∼ −40° | $f_{m-1}$ |
| −40° ∼ −35° | $f_{m-2}$ |
| ⋮ | ⋮ |
| 0° ∼ 1° | $f_0$ |
| 1° ∼ 5° | $f_1$ |
| 5° ∼ 10° | $f_2$ |
| ⋮ | ⋮ |
| 45° ∼ | $f_n$ |
| ⋮ | ⋮ |

FIG.5

| USER ID | ROUTE ID | | START POINT | ... | VIA POINT | ... | END POINT |
|---|---|---|---|---|---|---|---|
| U0001 | P0001 | COORDINATES | $(x_A, y_A, h_A)$ | ... | $(x_B, y_B, h_B)$ | ... | $(x_C, y_C, h_C)$ |
| | | TRAVEL DIFFICULTY | 0 | ... | $C_B$ | ... | $C_C$ |
| | | ATTRIBUTE | HOME | ... | TRAFFIC LIGHT | ... | POST OFFICE |
| | P0002 | COORDINATES | $(x_A, y_A, h_A)$ | ... | $(x_2, y_2, h_2)$ | ... | $(x_3, y_3, h_3)$ |
| | | TRAVEL DIFFICULTY | 0 | ... | $C_2$ | ... | $C_3$ |
| | | ATTRIBUTE | HOME | ... | CONVENIENCE STORE | ... | STATION |
| | P0003 | COORDINATES | $(x_3, y_3, h_3)$ | ... | | ... | $(x_4, y_4, h_4)$ |
| | | TRAVEL DIFFICULTY | 0 | ... | | ... | $C_4$ |
| | | ATTRIBUTE | STATION | ... | | ... | HOSPITAL |

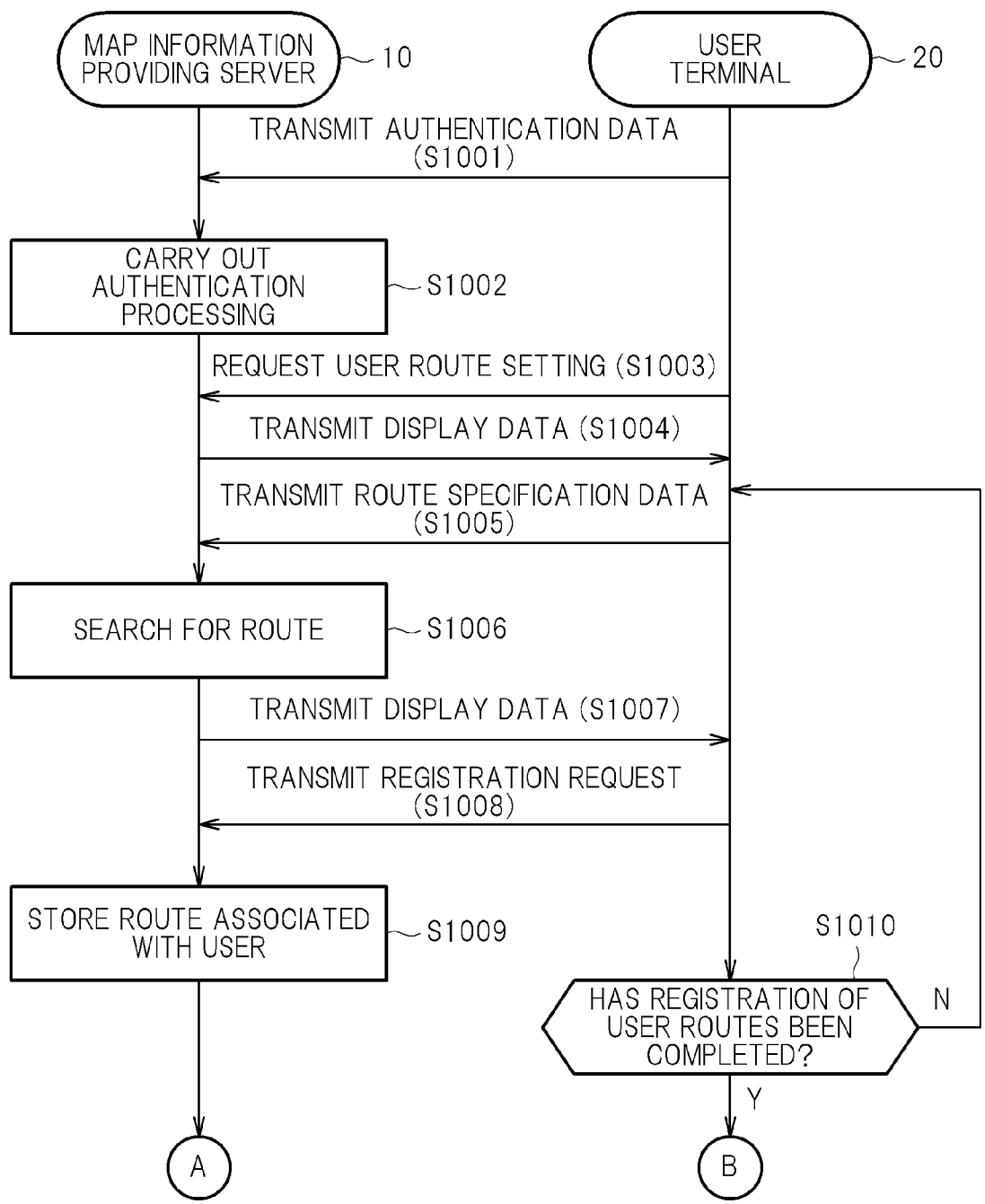

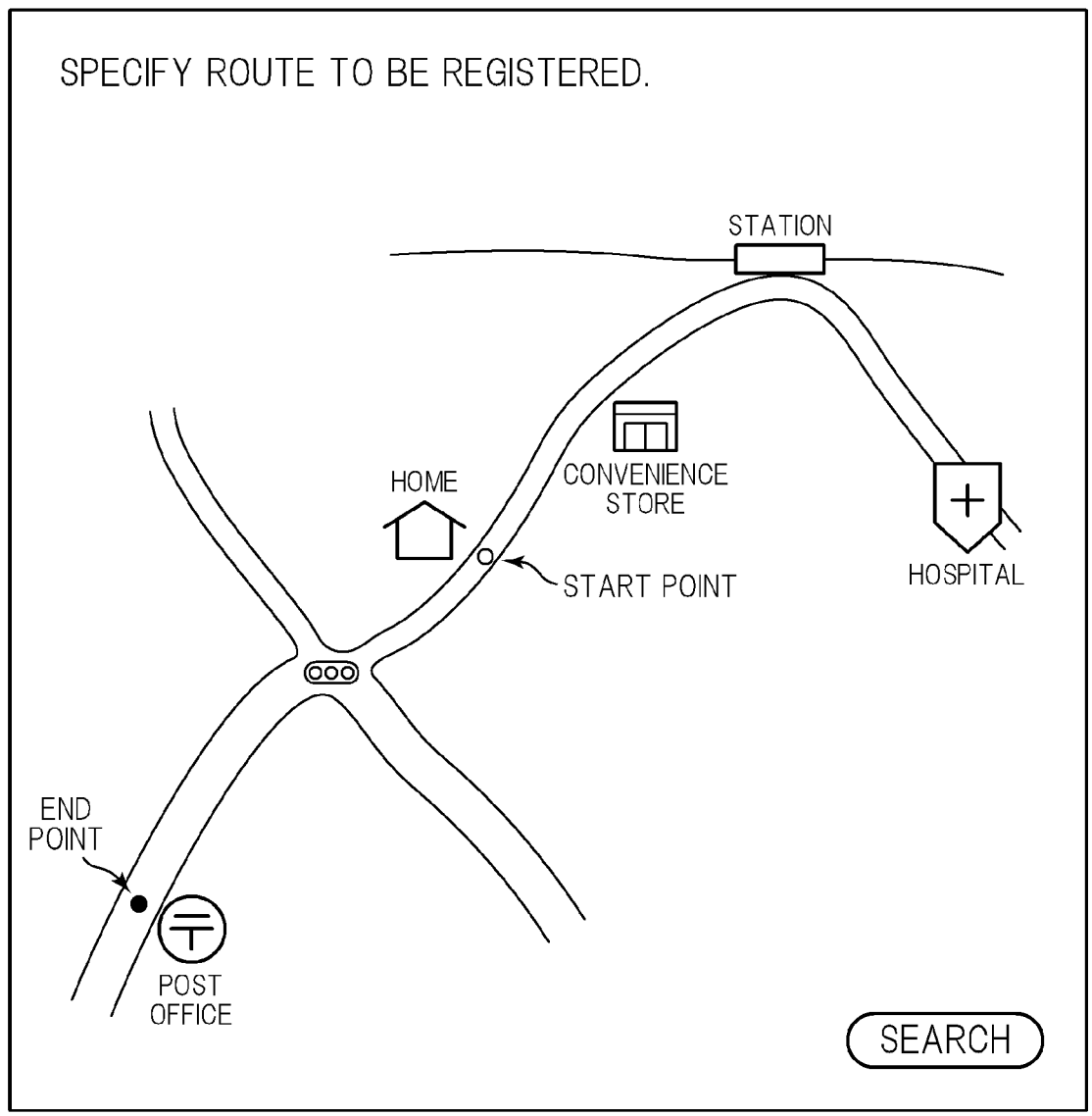

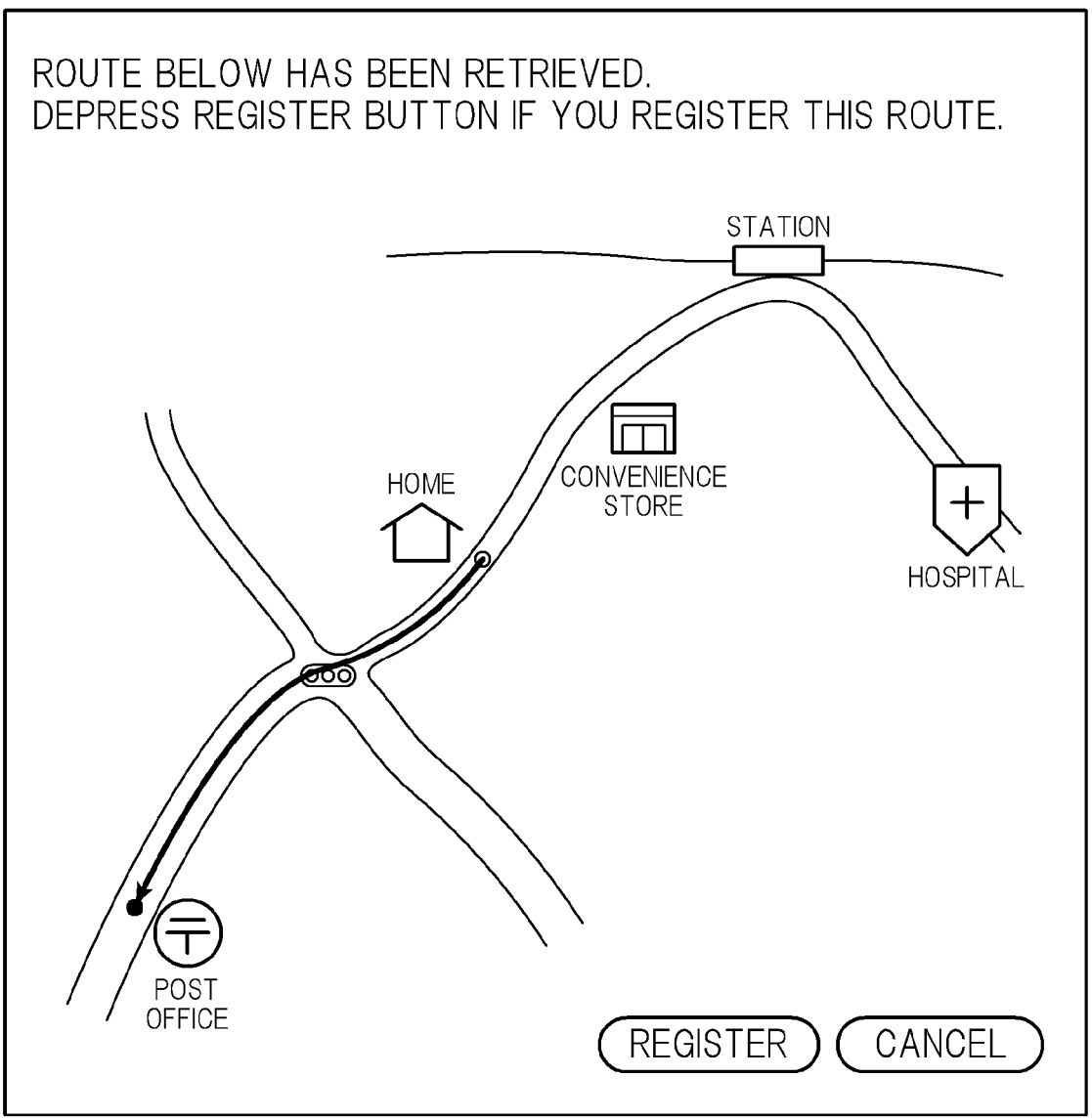

FIG.14

| θ | t |
|---|---|
| ~ −45° | 0.25 |
| −45° ~ −40° | 0.30 |
| −40° ~ −35° | 0.40 |
| ⋮ | ⋮ |
| 0° ~ 1° | 1.00 |
| 1° ~ 5° | 1.05 |
| 5° ~ 10° | 1.10 |
| ⋮ | ⋮ |
| 45° ~ | 2.50 |
| ⋮ | ⋮ |

FIG.15

| θ | METS |
|---|---|
| ~ −45° | 2.0 |
| −45° ~ −40° | 2.2 |
| −40° ~ −35° | 2.4 |
| ⋮ | ⋮ |
| 0° ~ 1° | 3.2 |
| 1° ~ 5° | 3.25 |
| 5° ~ 10° | 3.3 |
| ⋮ | ⋮ |
| 45° ~ | 3.8 |
| ⋮ | ⋮ |

ROUTE INFORMATION PROVIDING DEVICE, ROUTE INFORMATION PROVIDING METHOD, PROGRAM, AND INFORMATION RECORDING MEDIUM

CROSS REFERENCE TO RELATED APPLICATIONS

This application is a National Stage of International Application No. PCT/JP2011/075625 filed Nov. 7, 2011, claiming priority based on Japanese Patent Application No. 2011-016633, filed Jan. 28, 2011, the contents of all of which are incorporated herein by reference in their entirety.

TECHNICAL FIELD

The present invention relates to a route information providing device, a route information providing method, a program, and an information recording medium.

BACKGROUND ART

There is known a service for providing map information in response to a request from a user terminal. For example, according to the following Patent Literature 1, in such service, an area of a large-scale object represented by a rectangular region displayed on a map can be intuitively recognized by the user by displaying the number obtained from dividing the area of the rectangular region by an area of a chosen famous building (such as a dome baseball stadium).

CITATION LIST

Patent Literature

Patent Literature 1: JP 2010-134887 A

SUMMARY OF INVENTION

Technical Problem

However, in a case where a route connecting between a start point and an endpoint set on a map is searched for, and is provided for a user, even if the routes are compared with the use of a generally famous index as a reference as in the related art, when the index is not familiar to the user, the user cannot recognize labor required for traveling on the route.

The present invention has been made in view of the above-mentioned problem and has an object to provide a route information providing device, a route information providing method, a program, and an information recording medium, which enable a user to intuitively recognize labor of traveling on a route.

Solution to Problem

In order to achieve the above-mentioned object, according to the present invention, there is provided a route information providing device, including: means for storing map data including an undulation of an actual topography; means for storing information on first routes each containing one or more routes from a point, as a start point, corresponding to information on a user in the map data, to a plurality of predetermined points in a region containing the point corresponding to the information on the user in the map data, in association with identification information on the user; determination means for determining a second route from a start point to an end point specified based on a request from the user; comparison means for directly or indirectly comparing a length of the second route and an undulation on the second route, and a length of each of the first routes and an undulation on each of the first routes with each other in the map data; and information providing means for providing the user with information on a comparison result by the comparison means.

According to the present invention, there is also provided a route information providing device, including: means for storing map data including an undulation of an actual topography; acquisition means for acquiring information on first routes each containing one or more routes from a point, as a start point, corresponding to information on a user in the map data, to a plurality of predetermined points in a region containing the point corresponding to the information on the user in the map data; determination means for determining a second route from a start point to an end point specified based on a request from the user; comparison means for directly or indirectly comparing a length of the second route and an undulation on the second route, and a length of each of the first routes and an undulation on each of the first routes with each other in the map data; and information providing means for providing the user with information on a comparison result by the comparison means.

According to an aspect of the present invention, the acquisition means acquires information on the first routes within a predetermined range with the point corresponding to the information on the user being the start point and the length of the second route being a reference.

According to an aspect of the present invention, the comparison means performs any comparison selected from a comparison between travel difficulties each determined based on a length of a route and an undulation on the route with each other, a comparison between lengths each obtained by correcting the length of the route based on the undulation on the route with each other, and a comparison between travel difficulties each determined based on a length obtained by correcting the length of the route based on the undulation on the route and the undulation on the route with each other.

According to an aspect of the present invention, the route information providing device further includes selection means for selecting, as a reference route, a first route closest to the second route in travel difficulty when the comparison means compares travel difficulties each determined based on a length of a route and an undulation on the route with each other, or travel difficulties each determined based on a length obtained by correcting the length of the route based on the undulation on the route and the undulation on the route with each other, or in length when the comparison means compares lengths each obtained by correcting the length of the route based on the undulation on the route with each other, and the information providing means provides the user with information on the reference route selected by the selection means as the information based on the comparison result by the comparison means.

According to an aspect of the present invention, the selection means selects, as the reference route, a route closest in topography, out of the plurality of first routes, when the comparison means compares the travel difficulties each obtained based on the length of the route and the undulation on the route with each other, or the travel difficulties each obtained based on the length obtained by correcting the length of the route based on the undulation on the route and the undulation on the route with each other.

According to an aspect of the present invention, the respective travel difficulties of the first route and the second route are calculated with the length of each of the first route and the second route, the undulation of each of the first route and the second route, and a load corresponding to an object contained in each of the first route and the second route being considered as parameters.

According to an aspect of the present invention, the travel difficulty of the second route is calculated so as to have a larger value when it is determined that an environment of the second route is not an environment usually experienced by the user than a value calculated when it is determined that the environment of the second route is the environment usually experienced by the user.

According to an aspect of the present invention, the one or more routes contained in the plurality of first routes respectively contain one or more via points, and the comparison means is capable of setting a via point contained in each of the first routes as an end point of the first route thereby forming a new first route.

According to an aspect of the present invention, the comparison means determines a correlation between curves respectively representing the first route and the second route when the comparison means directly compares the first route and the second route, and compares characteristic quantities based on topographies of the first route and the second route when the comparison means indirectly compares the first route and the second route.

According to the present invention, there is provided a route information providing method for a route information providing device, the route information providing device including: means for storing map data including an undulation of an actual topography; and means for storing information on first routes each containing one or more routes from a point, as a start point, corresponding to information on a user in the map data, to a plurality of predetermined points in a region containing the point corresponding to the information on the user in the map data, in association with identification information on the user, the route information providing method including: a determination step of determining a second route from a start point to an end point specified based on a request from the user; a comparison step of directly or indirectly comparing a length of the second route and an undulation on the second route, and a length of each of the first routes and an undulation on each of the first routes with each other in the map data; and an information providing step of providing the user with information on a comparison result of the comparison step.

According to the present invention, there is also provided a route information providing method for a route information providing device, the route information providing device including means for storing map data including an undulation of an actual topography, the route information providing method including: an acquisition step of acquiring information on first routes each containing one or more routes from a point, as a start point, corresponding to information on a user in the map data, to a plurality of predetermined points in a region containing the point corresponding to the information on the user in the map data; a determination step of determining a second route from a start point to an end point specified based on a request from the user; a comparison step of directly or indirectly comparing a length of the second route and an undulation on the second route, and a length of each of the first routes and an undulation on each of the first routes with each other in the map data; and an information providing step for providing the user with information on a comparison result of the comparison step.

According to the present invention, there is provided a program for controlling a computer, the computer including: means for storing map data including an undulation of an actual topography; and means for storing information on first routes each containing one or more routes from a point, as a start point, corresponding to information on a user in the map data, to a plurality of predetermined points in a region containing the point corresponding to the information on the user in the map data, in association with identification information on the user, the program controlling the computer to function as: determination means for determining a second route from a start point to an end point specified based on a request from the user; comparison means for directly or indirectly comparing a length of the second route and an undulation on the second route, and a length of each of the first routes and an undulation on each of the first routes with each other in the map data; and information providing means for providing the user with information on a comparison result by the comparison means.

According to the present invention, there is also provided a program for controlling a computer, the computer including means for storing map data including an undulation of an actual topography, the program controlling the computer to function as: acquisition means for acquiring information on first routes each containing one or more routes from a point, as a start point, corresponding to information on a user, to a plurality of predetermined points in a region containing the point corresponding to the information on the user in the map data; determination means for determining a second route from a start point to an end point specified based on a request from the user; comparison means for directly or indirectly comparing a length of the second route and an undulation on the second route, and a length of each of the first routes and an undulation on each of the first routes with each other in the map data; and information providing means for providing the user with information on a comparison result of the comparison means.

According to the present invention, there is provided an information recording medium having a program for controlling a computer recorded thereon, the computer including: means for storing map data including an undulation of an actual topography; and means for storing information on first routes each containing one or more routes from a point, as a start point, corresponding to information on a user in the map data, to a plurality of predetermined points in a region containing the point corresponding to the information on the user in the map data, in association with identification information on the user, the program controlling the computer to function as: determination means for determining a second route from a start point to an end point specified based on a request from the user; comparison means for directly or indirectly comparing a length of the second route and an undulation on the second route, and a length of each of the first routes and an undulation on each of the first routes with each other in the map data; and information providing means for providing the user with information on a comparison result by the comparison means.

According to the present invention, there is also provided an information recording medium having a program for controlling a computer recorded thereon, the computer including means for storing map data including an undulation of an actual topography, the program controlling the computer to function as: acquisition means for acquiring information on first routes each containing one or more routes from a point, as a start point, corresponding to information on a user, to a plurality of predetermined points in a region containing the point corresponding to the information on the user in the map data; determination means for determining a second route from a start point to an end point specified based on a request from the user; comparison means for directly or indirectly comparing a length of the second route and an undulation on the second route, and a length of each of the first routes and an undulation on each of the first routes with each other in the map data; and information providing means for providing the user with information on a comparison result of the comparison means.

Advantageous Effects of Invention

According to an aspect of the present invention, the user may be made to intuitively recognize labor of traveling on a route.

BRIEF DESCRIPTION OF DRAWINGS

FIG. 4 A table showing an example of values of F corresponding to an angle θ.

FIG. 5 A table showing an example of a user route table.

FIG. 9A A sequence diagram of processing carried out in the map information providing system.

FIG. 10 A diagram illustrating an example of a setting screen for a user route.

FIG. 11 A diagram illustrating an example of a display screen displaying a retrieved route.

FIG. 14 A table showing an example of values of t corresponding to the angle θ.

FIG. 15 A table showing an example of values of METS corresponding to the angle θ.

DESCRIPTION OF EMBODIMENTS

Figure 1:
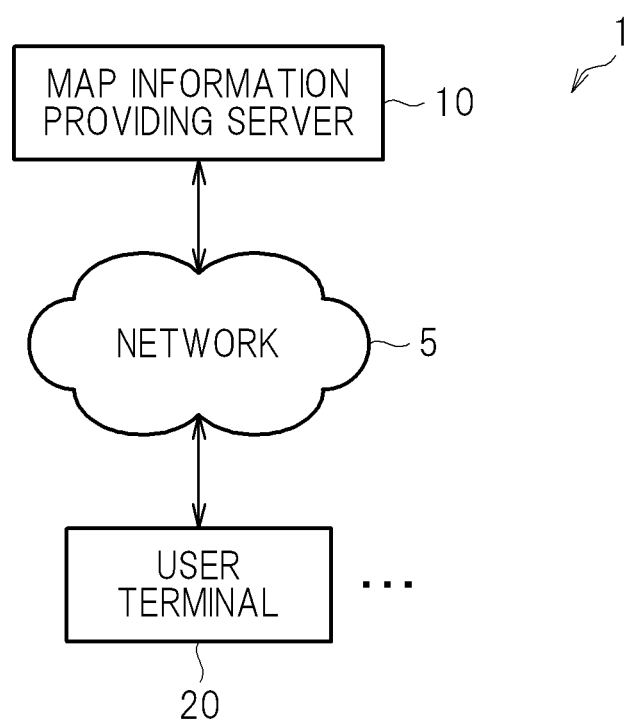
FIG. 1 A system configuration diagram of a map information providing system according to an embodiment of the present invention.

A description is now given of an embodiment mode (hereinafter, referred to as embodiment) for carrying out the present invention referring to the drawings.

FIG. 1 illustrates a system configuration diagram of a map information providing system 1 according to this embodiment. As illustrated in FIG. 1, the map information providing system 1 includes a user terminal 20 and a map information providing 5 server 10, and the user terminal 20 and the map information providing server 10 are connected to each other via a network 5 such as the Internet so as to be able to mutually communicate data.

The user terminal 20 is a computer operated by a user such as a personal computer and a mobile terminal. The user terminal 20 makes an access to the map information providing server 10 in accordance with a program such as a Web browser in response to an operation of the user, and receives map information from the accessed map information providing server 10. Then, the user terminal 20 displays the received map information on a display device such as a liquid crystal display.

The map information providing server 10 is a computer for generating map information containing route information connecting a point and another point with each other on a map in response to the request from the user terminal 20, and then providing the user terminal 20 with the map information.

Figure 2:
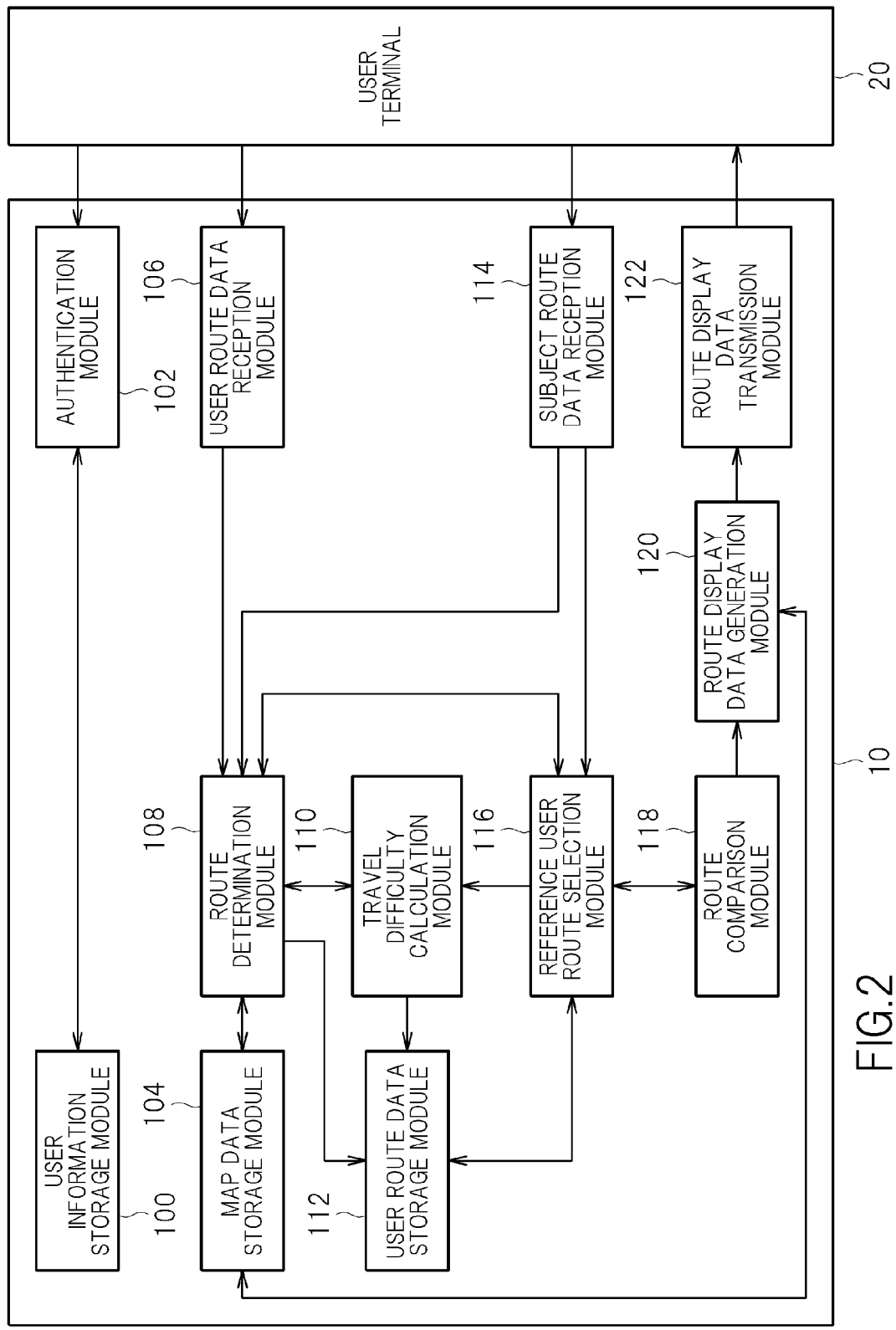
FIG. 2 A functional block diagram illustrating an example of functions provided for a map information providing server.

FIG. 2 is a functional block diagram illustrating an example of functions provided for the map information providing server 10 according to this embodiment. As illustrated in FIG. 2, the map information providing server 10 includes a user information storage module 100, an authentication module 102, a map data storage module 104, a user route data reception module 106, a route determination module 108, a travel difficulty calculation module 110, a user route data storage module 112, a subject route data reception module 114, a reference user route selection module 116, a route comparison module 118, a route display data generation module 120, and a route display data transmission module 122.

A function of each of the above-mentioned modules provided for the map information providing server 10 may be realized by a computer, which includes hardware such as control means such as a CPU, storage means such as a memory, and communication means such as a communication interface for transmitting/receiving data to/from external devices, reading a program stored in a computer-readable information storage medium and executing the program. Note that, the program may be supplied to the map information providing server 10 via an information storage medium such as an optical disc, a magnetic disk, a magneto-optical disk, a flash memory, or supplied to the map information providing server 10 via a data communication network such as the Internet.

The user information storage module 100 stores authentication information and various types of attribute information on each of the users. For example, the authentication information may be a combination of a user ID for identifying a user, and a password, and the attribute information may include various types of information such as an address, a name, and a date of birth of the user.

The authentication module 102 carries out user authentication based on the authentication information received from the user terminal 20. For example, the authentication module 102 may carry out the authentication based on whether or not a combination of a user ID and a password received from the user terminal 20 coincides with a combination of the user ID and the password stored in the user information storage module 100. The map information providing server 10 may provide an authenticated user terminal 20 with a cookie representing a successful authentication, and may carry out subsequent authentication based on the cookie received from the user terminal 20.

The map data storage module 104 stores map data containing undulations of actual topographies. For example, the map data may contain information representing a location of a specific point or region in a predetermined space, and information associated with this information. Moreover, a location indicated on the map data may include information on a latitude, a longitude, and an elevation (or information corresponding thereto). Then, the map data may contain location information and attribute information on each map object such as a road, a traffic light, a building, a park, a store, a residence, and a station. The attribute information may contain information on a type, a name, an address, and the like of the map object.

The user route data reception module 106 receives route specification data specifying a route to be registered from the user terminal 20 operated by the user authenticated by the authentication module 102 while the route specification data is associated with the user. For example, the route specification data received by the user route data reception module 106 may be information on a start point and an end point on a map, may contain information on a start point, an end point, and via points which are passed therebetween, or may be information on a route specified on the map by the user by means of an input device such as a pointing device. Note that, each point of the start point, the end point, and the via points may be an arbitrary point on a map, or an object identified by an address, a name, or the like. Moreover, the user route data reception module 106 may receive a search query such as "from AAA (name of a start point) to BBB (name of an end point)" as the route specification data.

The route determination module 108 searches for and determines a route connecting the specified plurality of points on the map. For example, the route determination module 108 searches for, based on the route data received by the user route data reception module 106, a route on the map connecting the start point and the end point (as well as the via points) represented by the route data. The route search may be carried out by searching for a route satisfying predetermined conditions out of routes from the start point to the end point. Note that, the predetermined conditions may include one or a plurality of combined various conditions such as a condition that a length of a route is minimum, a condition that a travel time of traveling on a route is minimum, and a condition that a travel difficulty (travel difficulty is described later) of a route is minimum.

The travel difficulty calculation module 110 calculates a travel difficulty representing a difficulty for traveling from a start point to a given point (such as an end point) on a route. For example, the travel difficulty may be a numerical value calculated based on the length of the route and an undulation on the route in the map data, or may be a level determined corresponding to the calculated numerical value. A range of belonging numerical values may be determined in advance for each of the levels. Moreover, when the travel difficulty relating to a route is calculated, in addition to the undulation on the route and the length of the route, parameters such as a season, weather, an atmospheric temperature, a humidity, presence/absence of objects existing on the route such as a stairs, a railroad crossing, a traffic light, an underground passage, and an overpass, and a road surface state may be used, for example. For example, the undulation of a route may be represented by an inclination (angle) or a difference in elevation between arbitrary two points contained in the route. According to this embodiment, the length of a route is a length of the route in a space, namely, a length determined by correcting the length of the route based on the undulation on the route, but a route length represented on a flat map may be used as the length of a route. Moreover, the travel difficulty calculation module 110 may also calculate a travel difficulty up to a via point which is passed between the start point and the end point of a specified route. A description is now given of a specific example of the travel difficulty calculated by the travel difficulty calculation module 110.

The travel difficulty calculation module 110 may calculate the travel difficulty of a route, for example, based on a quantity of physical work required for traveling on the route from the start point to the end point. For example, the travel difficulty calculation module 110 may divide the route into a plurality of portions, may calculate a partial travel difficulty for each of the portions, and may calculate the travel difficulty by summing the calculated partial travel difficulties. The division of the route may be carried out at least at locations of via points set on the route, and if the number of divisions of the portions is infinite, the travel difficulty of the route theoretically coincides with the physical work required for traveling on the route. A description is now given of an example of the calculation of the partial travel difficulty.

Figure 3:
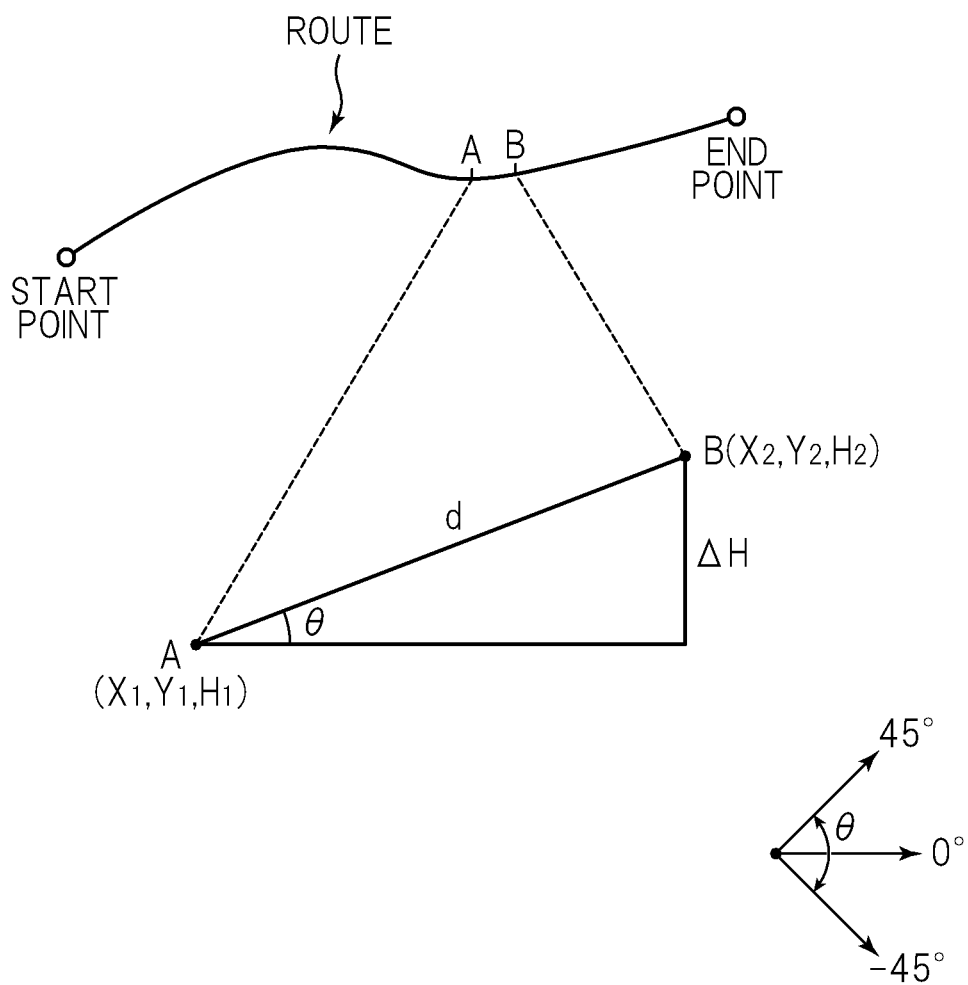
FIG. 3 A diagram illustrating a calculation example of a partial travel difficulty.

FIG. 3 is a diagram for describing a calculation example of the partial travel difficulty. As illustrated in FIG. 3, two points extracted from a certain route are a point A and a point B, and coordinates of the respective points in a Cartesian coordinate system are represented as the point A (X1, Y1, H1) and the point B (X2, Y2, H2). On this occasion, a travel difficulty W required for traveling from the point A to the point B is calculated as $W=F(\theta) \cdot d$. In this expression, F denotes a force, and d denotes a travel distance, and d is determined as $d=\text{sqrt}(\Delta X^2 + \Delta Y^2 + \Delta H^2)$ where $\Delta X = X2-X1$, $\Delta Y=Y2-Y1$, and $\Delta H = H2-H1$. Moreover, $F(\theta)$ may be determined corresponding to an angle $\theta$ from the point A to the point B.

FIG. 4 is a table showing an example of values of F corresponding to the angle $\theta$. As shown in FIG. 4, a value of F may be set in advance for each of the ranges of the angle $\theta$, and a positive $\theta$ corresponds to an ascending slope, a zero $\theta$ corresponds to a flat road, and a negative $\theta$ corresponds to a descending slope. Note that, $\theta$ is determined based on $\sin\theta = \Delta H/d$. It is to be understood that the travel difficulty calculation module 110 may calculate the travel difficulty W by means of another calculation method. For example, the travel difficulty W may be calculated based on $W=\alpha d + \beta \Delta H$ where $\alpha$ and $\beta$ are coefficients. Note that, in an example illustrated in FIG. 4, when the angle $\theta$ is within a range of 0 to 1 degree, F may be minimum, and F may increase as the angle $\theta$ increases or decreases from the range of 0 to 1 degree. On this occasion, an increase rate to be used when F increases as the angle $\theta$ increases from the range of 0 to 1 degree may be higher than an increase rate to be used when F increases as the angle $\theta$ decreases from the range of $\theta$ to 1 degree.

The user route data storage module 112 stores information on a route (first route) determined based on the route specification data received from the user route data reception module 106 for each of the users. According to this embodiment, the user route data storage module 112 stores the route data while the route data is associated with the user ID, and the route data contains information on the start point, the via points, and the end point, and the travel difficulties required for traveling up to the respective points calculated by the travel difficulty calculation module 110.

FIG. 5 shows an example of a user route table stored in the user route data storage module 112. As shown in FIG. 5, the user route table stores route data containing route IDs identifying routes, and start points, via points, and end points of the routes, which are associated with user IDs. For example, information on the start points, via points, and end points contains coordinates of each of the points, a travel difficulty up to each of the points, and attribute information (type of the point and the like) on each of the points.

The subject route data reception module 114 receives subject route specification data from the user terminal 20 operated by the user authenticated by the authentication module 102. For example, the route specification data received by the subject route data reception module 114 may be information on a start point and an end point on a map, may contain information on a start point, an end point, and via points which are passed therebetween, or may be information on a route specified on the map by the user by means of an input device such as a pointing device. Note that, each point of the start point, the end point, and the via points may be an arbitrary point on a map, or an object identified by an address, a name, or the like. Moreover, the subject route data reception module 114 may receive a search query such as "from AAA (name of a start point) to BBB (name of an end point)" as the route specification data.

The route determination module 108 searches for, based on the route specification data received by the subject route data reception module 114, a route (subject route) on the map connecting the start point and the end point (as well as the via points) represented by the route specification data.

The travel difficulty calculation module 110 calculates the travel difficulty representing a difficulty in traveling from the start point to the end point on the subject route (second route) determined by the route determination module 108. A specific example of the calculation method for the travel difficulty is as described above.

The reference user route selection module 116 directly or indirectly compares the length of the subject route and the undulation on the subject route, and the length of each of the user routes and the undulation on each of the user routes with each other in the map data, and selects a user route considered as a reference (reference user route) from the user routes based on the comparison result.

The direct comparison between the subject route and the user route means direct comparison between respective topographies themselves of the subject route and user route, and, for example, the reference user route selection module 116 may calculate a correlation value between curves representing the subject route and the user route, which is determined when the start points of the subject route and the user route are matched with each other, and may select a user route having the maximum correlation value as the reference user route. On this occasion, the reference user route selection module 116 generates the curves representing the respective routes of the subject route and the user route by including recesses and protrusions corresponding to the type and the location of each of objects such as stairs, a traffic light, or a railroad crossing, and a frequency component corresponding to a state of a road surface (such as presence/absence of pavement) (for example, by superimposing a high-frequency noise in a case of an unpaved road, and without superimposing a noise component in a case of a paved road).

Moreover, the indirect comparison between the subject route and the user route means a comparison between numerical values and levels representing respective routes calculated from characteristic quantities relating to the respective topographies of the subject route and the user route, and, for example, the reference user route selection module 116 may compare the travel difficulties calculated respectively for the subject route and the user route, and may select a user route having the closest travel difficulty as the reference user route.

According to this embodiment, the reference user route selection module 116 selects the user route to be used as the reference (reference user route) out of the user route group based on the travel difficulty calculated for the subject route determined based on the data received from the user and the travel difficulties calculated for the respective user routes which are contained in the user route group and are registered while the travel difficulties are associated with the user. For example, the user route group may be the route data stored in the user route data storage module 112 while the route data is associated with the user ID for identifying the user relating to the subject route data received by the subject route data reception module 114. A description is now given of an example of selecting the reference user route by the reference user route selection module 116.

For example, the reference user route selection module 116 may select a user route closest in the travel difficulty to the subject route as the reference user route out of the user routes contained in the user route group. Pieces of data both calculated by using the same parameter may be used for the travel difficulty of the user route and the travel difficulty of the subject route to be used for selecting the reference user route. Moreover, the reference user route may be selected from user routes, the travel difficulty of which is equal to or more than the travel difficulty of the subject route, out of the user routes contained in the user route group. When there are plurality of user routes contained in the user route group within a predetermined range of a difference in travel difficulty from the subject route, a user route closest in an index representing the topography of the route such as the average value or variance value of a gradient to the subject route may be selected as the reference user route.

Moreover, the reference user route selection module 116 may select a user route, the travel difficulty of which is an integer multiple of the travel difficulty of the subject route, as the reference user route out of the user routes contained in the user route group.

Moreover, the reference user route selection module 116 may select a user route closest in a travel difficulty up to an intermediate via point to the subject route as the reference user route out of the user routes contained in the user route group. Specifically, the reference user route selection module 116 may search the user route table stored in the user route data storage module 112 using the travel difficulty of the subject route as a key, thereby identifying a via point storing a travel difficulty closest to the travel difficulty of the subject route, and may select a user route containing the identified via point as the reference user route. On this occasion, when there are a plurality of via points within a predetermined range of a difference in travel difficulty from the subject route, the route may be selected based on a priority corresponding to an attribute of each of the via points. In other words, when five via points within a predetermined range of the difference in travel difficulty from the subject route are acquired, attributes of the respective via points are a tourist spot, a station, a park, a store, and a traffic light, and the priority is defined as tourist spot>station>park>store>traffic light, a user route containing the via point the attribute of which is a tourist spot may be selected as the reference user route. The priority of the respective attributes may be specified by a user, or may be determined in advance based on search history of the user. Moreover, when there are a plurality of via points within a predetermined range of a difference in travel difficulty from the subject route, and there is a via point directly specified by the route data received by the user route data reception module 106, a user route containing this via point may be selected in priority as the reference user route.

The route comparison module 118 compares the subject route and the reference user route selected by the reference user route selection module 116. Specifically, the route comparison module 118 may determine a ratio between the travel difficulty of the reference user route and the travel difficulty of the subject route, or may identify a via point on the reference user route which approximately coincides with the subject route in the travel difficulty based on the ratio.

The route display data generation module 120 generates display data for displaying information based on a comparison result between the subject route and the reference user route. For example, the route display data generation module 120 may generate route display data for displaying information on the subject route displayed on a map determined by the route determination module 108, and information on the comparison result between the subject route and the reference user route by the route comparison module 118. Note that, the subject route and the comparison result between the subject route and the reference user route may be displayed on the same screen or may be displayed respectively on different screens.

Figure 6:
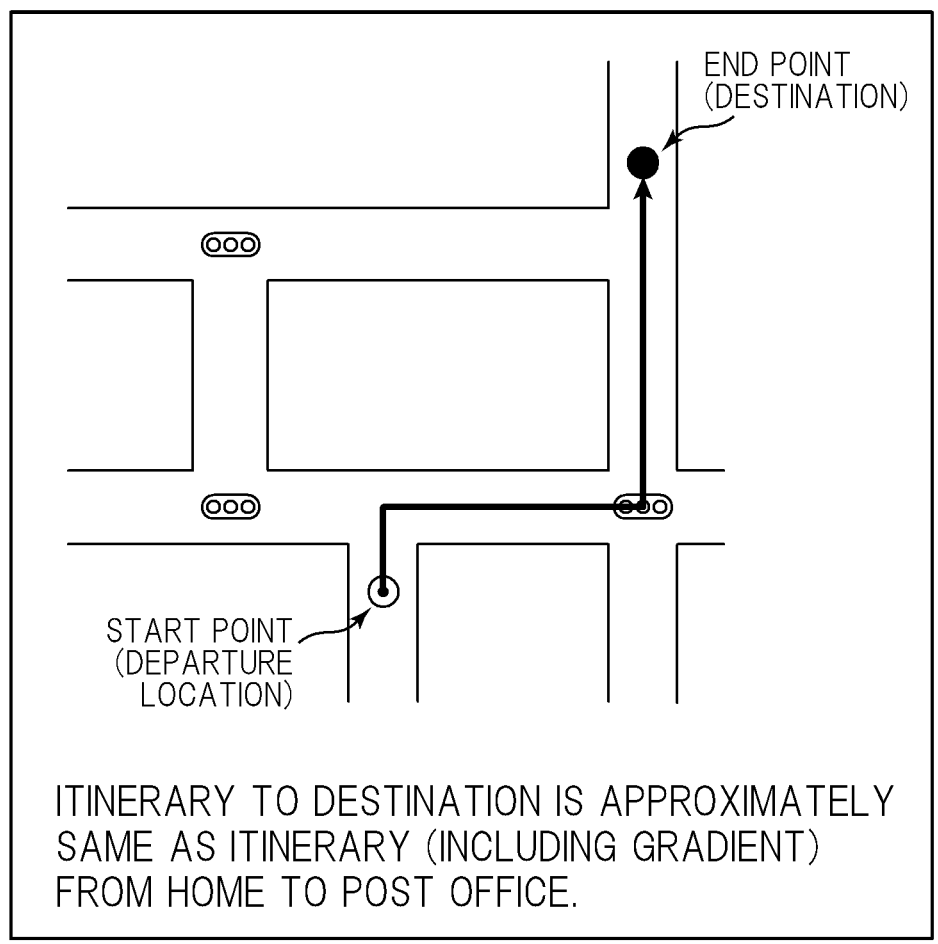
FIG. 6 A diagram illustrating an example of a display screen based on route display data.
Figure 7:
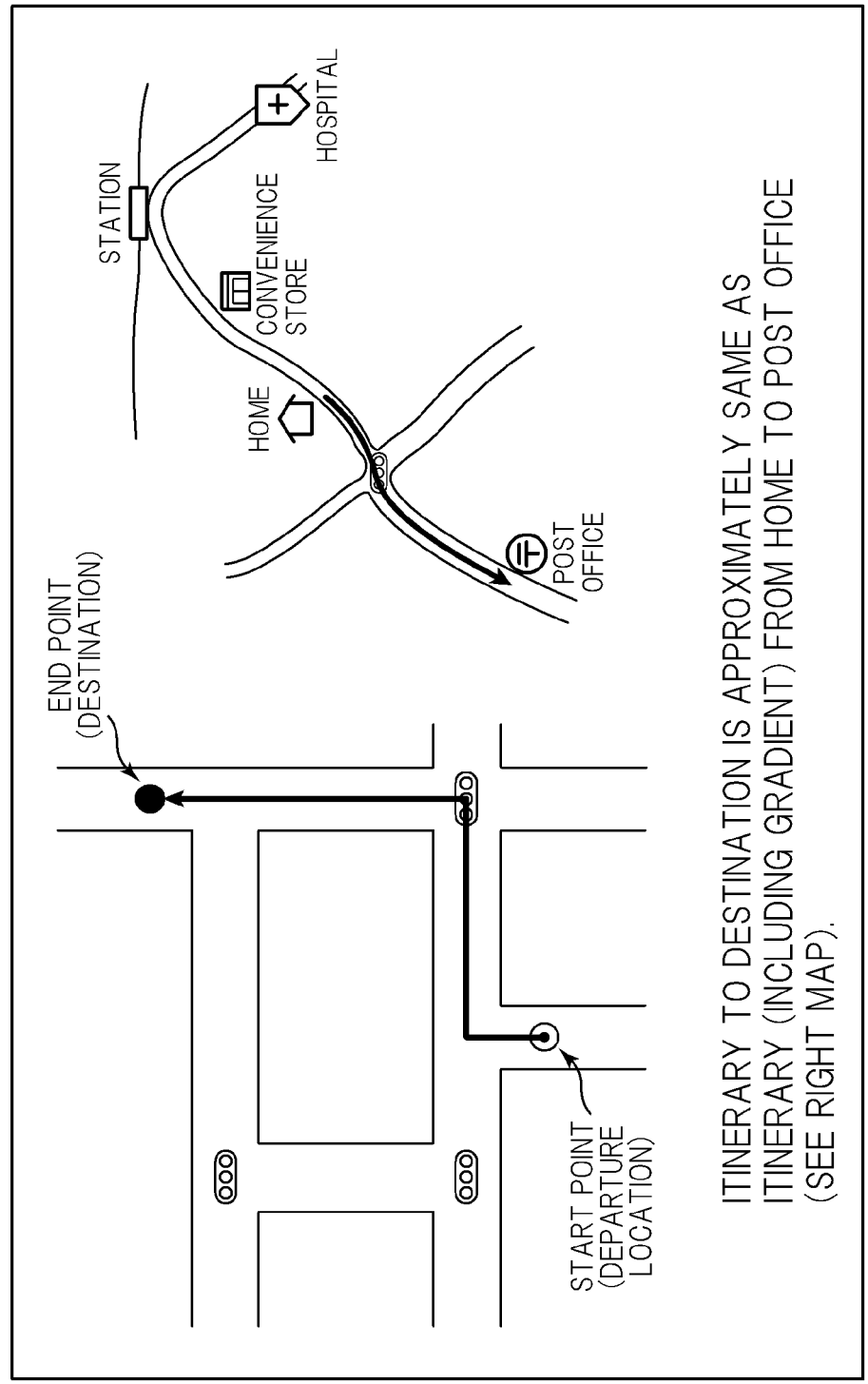
FIG. 7 A diagram illustrating an example of the display screen based on the route display data.
Figure 8:
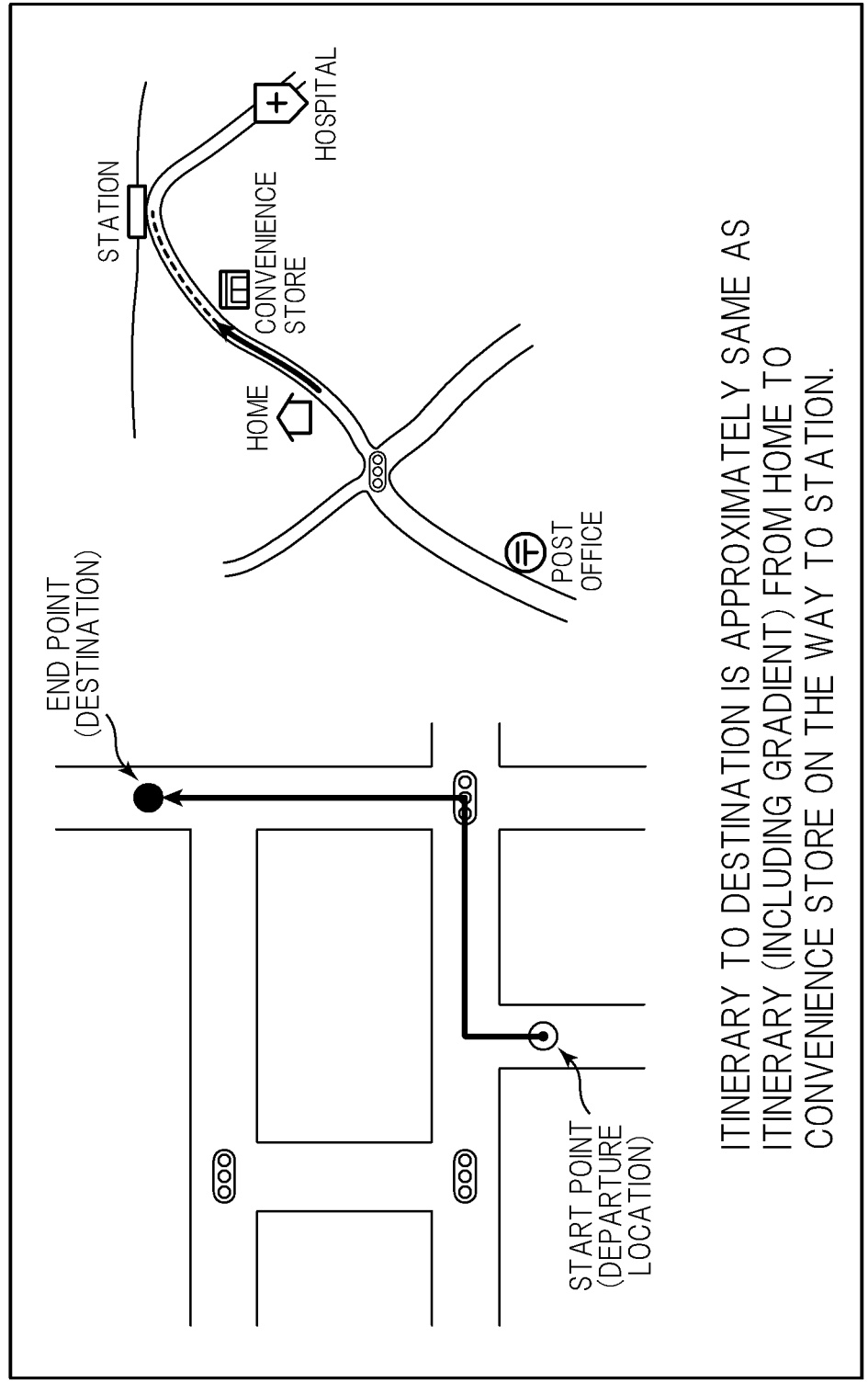
FIG. 8 A diagram illustrating an example of the display screen based on the route display data.

Examples of the display screen based on the route display data are illustrated in FIGS. 6 to 8. In the example illustrated in FIG. 6, map information on the subject route, the subject route, and text information (an itinerary to the destination is approximately the same as an itinerary from home to a post office) displaying the comparison result between the subject route and the corresponding reference user route are displayed on the display screen. Moreover, in the example illustrated in FIG. 7, the map information on the subject route (left side), text information representing a comparison result between the subject route and the reference user route, and map information on the reference user route (right side) are displayed on the display screen. Moreover, when the travel difficulty of the subject route is approximately the same as the travel difficulty up to a via point on the reference user route, as illustrated in FIG. 8, the map information on the subject route (left side), the map information on the reference user route (right side), and information on a corresponding portion on the reference user route (an itinerary to the destination is approximately the same as an itinerary up to the convenience store on an itinerary from home to the station) may be displayed on the display screen.

The route display data transmission module 122 transmits the route display data generated by the route display data generation module 120 to the user terminal 20 from which the route data is received by the subject route data reception module 114.

Figure 9B:
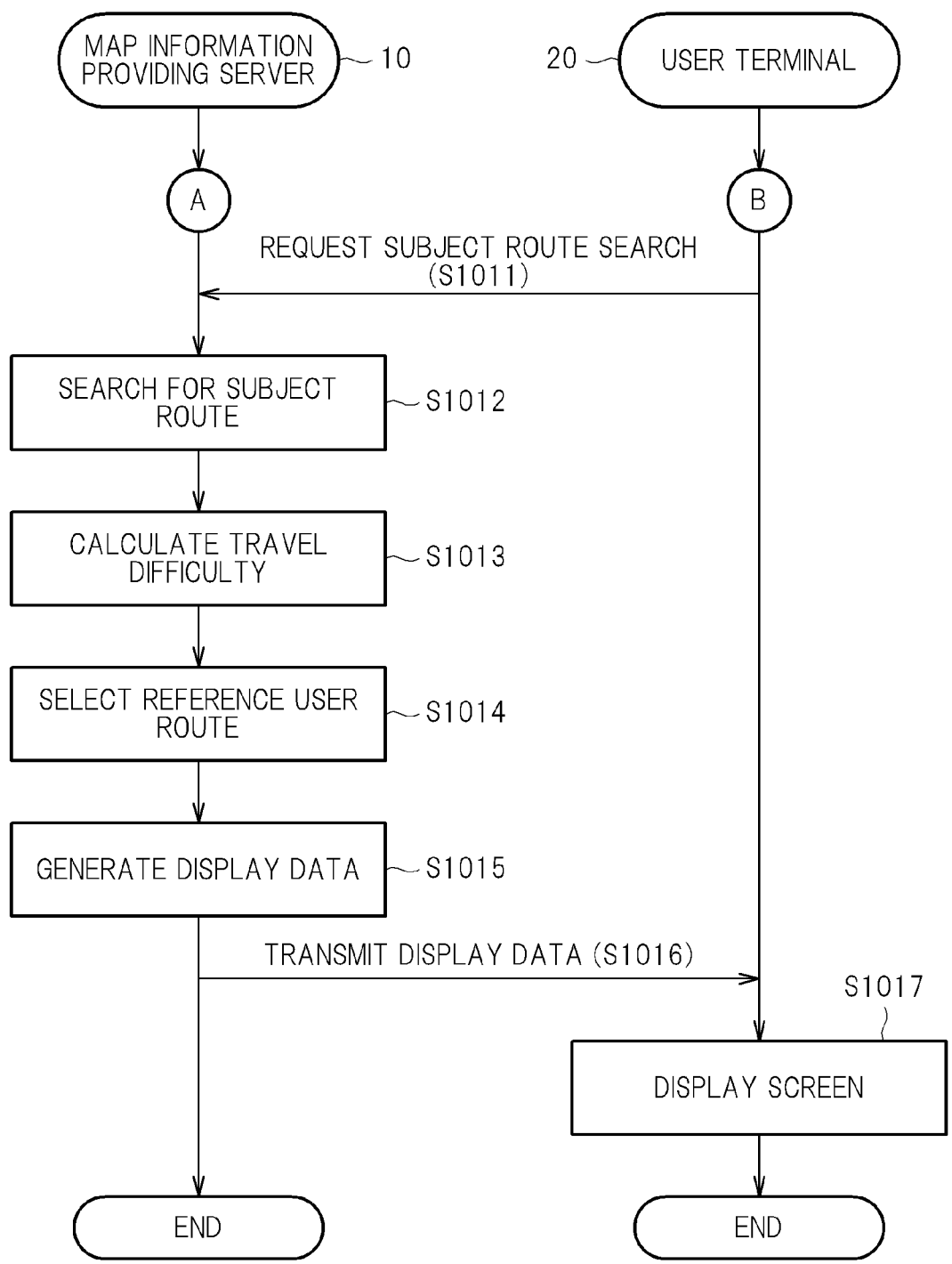
FIG. 9B A sequence diagram of the processing carried out in the map information providing system.

A description is now given of a flow of processing carried out on the map information providing system 1 referring to sequence diagrams illustrated in FIGS. 9A and 9B.

As illustrated in FIG. 9A, the user terminal 20 transmits authentication data containing the user ID, the password, and the like to the map information providing server 10 (S1001), and the map information providing server 10 carries out the authentication processing based on the authentication data received from the user terminal 20 (S1002). In the following, the description continues assuming that the user authentication is successful.

When the map information providing server 10 receives a setting request for user routes from the user terminal 20 (S1003), the map information providing server 10 transmits display data for displaying a setting screen for the user routes to the user terminal 20 (S1004).

FIG. 10 illustrates an example of the setting screen for the user routes. When the user specifies a start point and an endpoint, and depresses a "SEARCH" button on the setting screen for the user route illustrated in FIG. 10, route specification data containing information on the start point and the end point is transmitted to the map information providing server 10 (S1005).

The map information providing server 10 searches for a route based on the route specification data received from the user terminal 20 (S1006), and transmits display data for displaying a retrieved route to the user terminal 20 (S1007).

FIG. 11 illustrates an example of the display screen displaying the retrieved route. When the user depresses a "REGISTER" button for registering the retrieved route as a user route on the display screen illustrated in FIG. 11, a registration request is transmitted to the map information providing server 10 (S1008), and the retrieved user route associated with the user is stored (S1009). On this occasion, the map information providing server 10 may calculate a travel difficulty for the user route to be registered, and information on the calculated travel difficulty associated with the user route may be stored.

Figure 12:
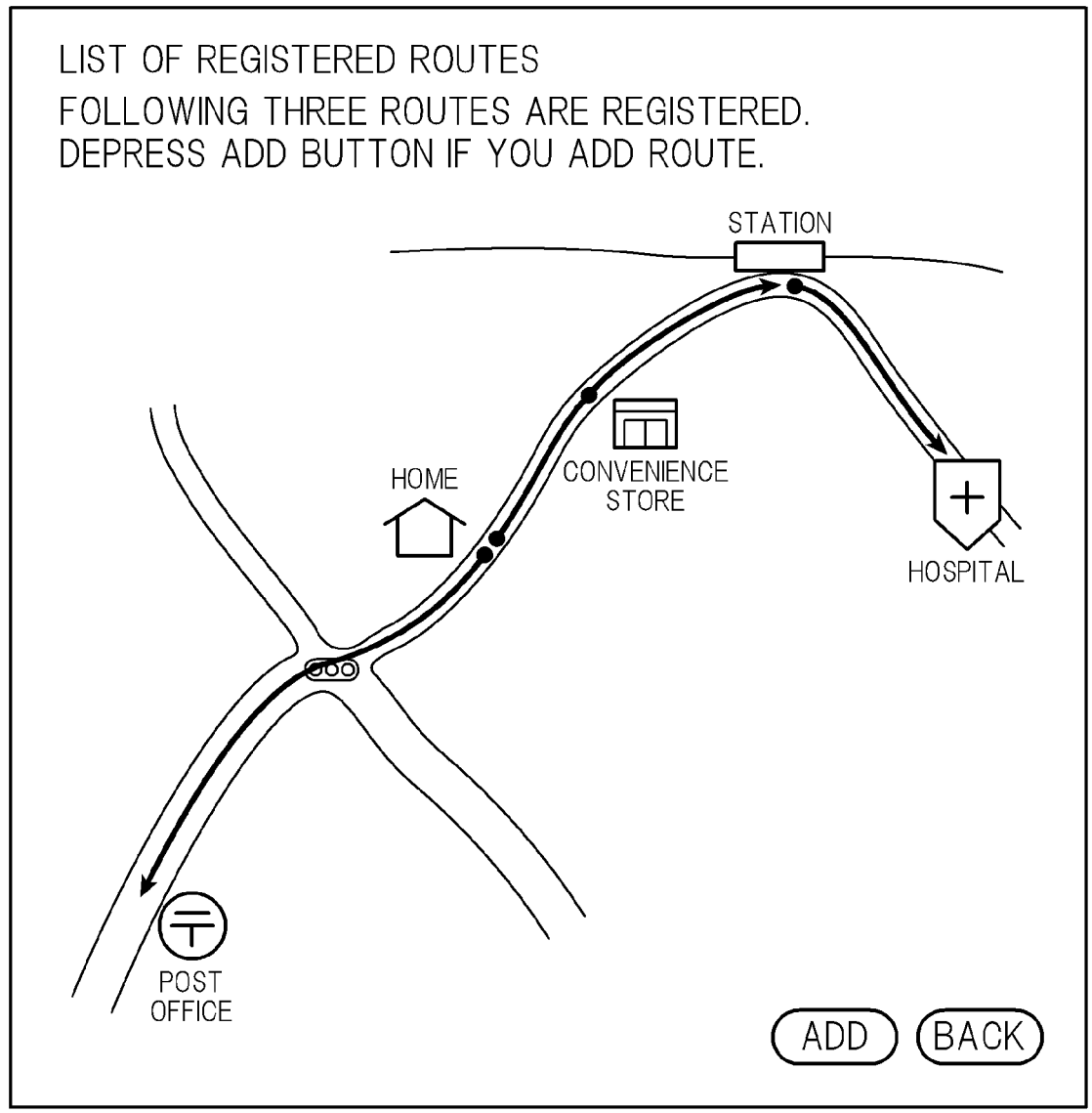
FIG. 12 A diagram illustrating an example of registered user routes.

When the registration of user routes has not been completed (N in S1010), the map information providing server 10 returns to S1005, and continues the registration of the user route, and when the registration of the user routes has been completed (Y in S1010), the map information providing server 10 proceeds to the sequence diagram illustrated in FIG. 9B. FIG. 12 illustrates an example of a list of the registered user routes. As illustrated in FIG. 12, the user route may contain a plurality of routes different in start point such as a route having the home of the user as a start point, and a route having a station as a start point.

The description continues referring to the sequence diagram illustrated in FIG. 9B. As illustrated in FIG. 9B, the user terminal 20 requests the map information providing server 10 to search for a route to be searched for (subject route) (S1011). For example, the user terminal 20 may request a search for the subject route by transmitting data specifying a start point and an end point on the map to the map information providing server 10.

Figure 13:
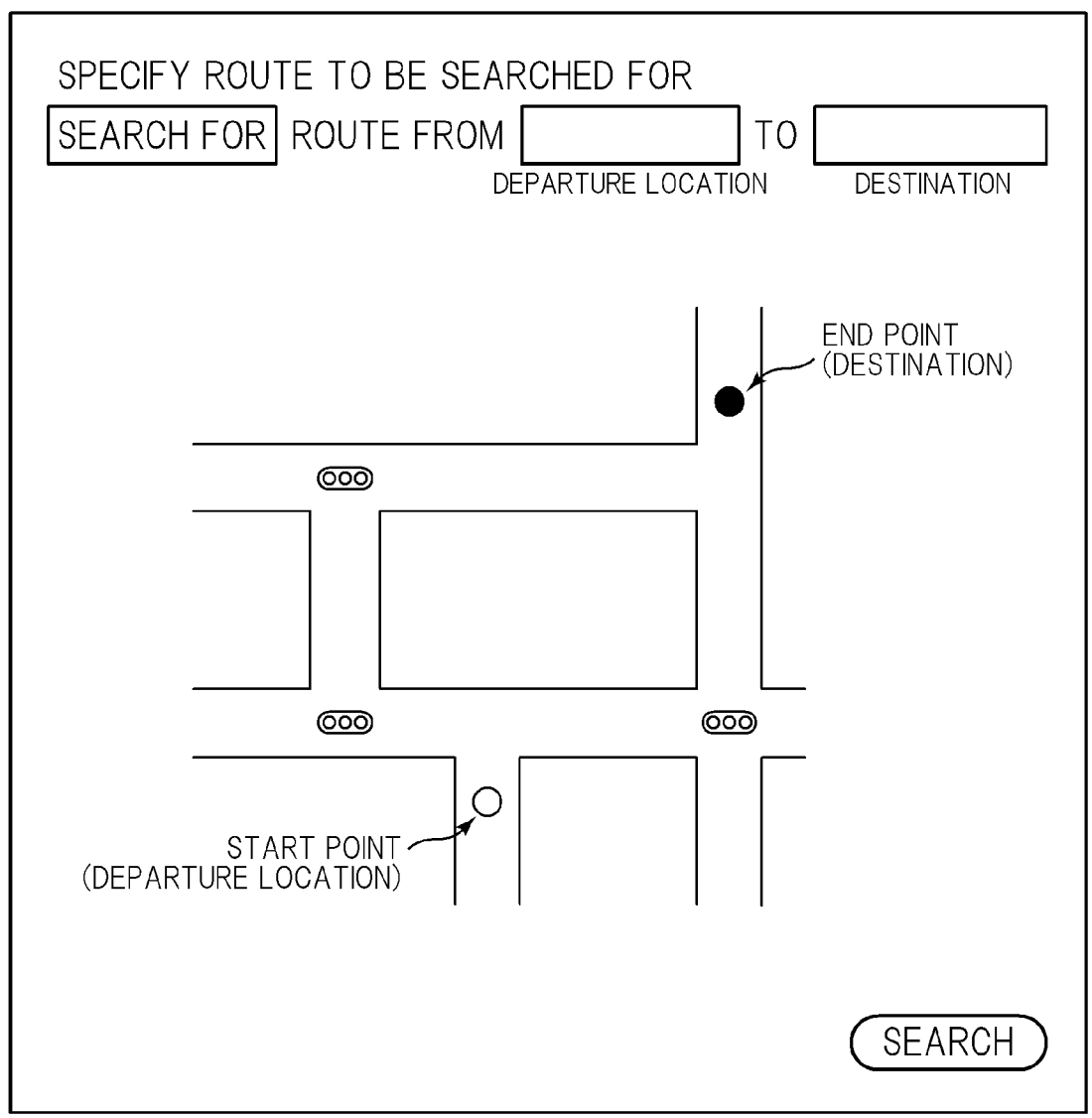
FIG. 13 A diagram illustrating an example of a specification screen for a subject route.

FIG. 13 illustrates an example of a specification screen for the subject route. In the example illustrated in FIG. 13, the start point and the end point are to be specified for the route, but the specification of the route is not limited to this example, and the route may be specified by means of a search query such as "from a point A to a point B". When the "SEARCH" button is depressed on the specification screen for the subject route illustrated in FIG. 13, a search request for the subject route containing the specified data is transmitted to the map information providing server 10.

When the map information providing server 10 receives the search request for the subject route, the map information providing server 10 searches for the subject route based on the route specification data contained in the search request (S1012), and calculates the travel difficulty of the retrieved subject route (S1013). Then, the map information providing server 10 compares the travel difficulty of the subject route, and the travel difficulty of each of the user routes contained in the user route group, and selects a reference user route to be used as the reference out of the user route group (S1014). The selection processing for the reference user route is described in detail above.

The map information providing server 10 compares the subject route and the reference user route, and generates display data for displaying both a comparison result thereof and the subject route (S1015). Then, the map information providing server 10 transmits the generated display data to the user terminal 20 (S1016), and the user terminal 20 displays a screen based on the display data received from the map information providing server 10 (S1017). Note that, examples of the screens to be displayed on the user terminal 20 are as illustrated in FIGS. 6 to 8.

The map information providing server 10 according to this embodiment described above adds a result of the comparison made to a route selected as a reference from routes registered in advance by a user to the information on a subject route provided for the user, and the user can thus intuitively recognize labor required for traveling on the subject route based on the known route. The provision of the labor traveling on the subject route for the user by means of the comparison with the known route is extremely useful because it is difficult to intuitively recognize the labor required for the travel to which actual undulations on the route are reflected from contour lines or the like drawn on a two-dimensional map displayed on the screen. Moreover, the travel difficulty of a route can be formed as an index close to labor actually felt by the user by calculating the travel difficulty based on undulations on the route and the length of the route compared with a case where a travel difficulty is simply calculated based on the distance on the map. Moreover, the user can recognize the labor required for traveling on the subject route approximated by that of a known route by selecting a user route approximately the same in travel difficulty as the subject road, and providing the information on the comparison of the selected user route to the subject route. Moreover, when there are plurality of user routes having the difference in travel difficulty from the subject route that is within the predetermined range, a user route having a characteristic closer to the subject route can be selected by narrowing down the user routes to a user route to be used as the reference based on another index of the travel difficulty. Moreover, even when the subject route and the user route do not coincide with each other in terms of the travel difficulty, a comparison result to the subject road can be provided by searching for a user route, the travel difficulty up to a via point of the user route of which is approximately the same as that of the subject route, and by using the retrieved user route as the reference.

Moreover, the present invention is not limited to the above-mentioned embodiment. For example, in the above-mentioned embodiment, an example in which user routes registered for each user are specified by the user is described, but the user routes may be registered as described below. Specifically, an address of a user stored in the user information storage module 100 may be acquired, and routes, the start point of which is this address and each of the end points of which is a predetermined point retrieved in a region containing this address of the user, may be registered as user routes. The predetermined points searched for in this case may be various map objects such as a tourist spot, a station, a park, and a public institution contained in the region, and which map objects are to be searched for may be determined in advance, or may be set for each user. In this way, the labor required for a user to register user routes can be reduced by registering the user routes based on the address of the user.

Moreover, according to the above-mentioned embodiment, user routes are registered in advance before the specification of a subject route is received, but the map information providing server 10 may set user routes after the reception of the specification of the subject route. In this case, for example, the map information providing server 10 may acquire the address of the user stored in the user information storage module 100, may set routes, the start point of which is the address of the user and each of the end points of which is the predetermined point retrieved from the region containing the address of the user, as user routes, and may select a user route closest in travel difficulty to the subject route out of the set user routes as a reference user route. Note that, when the map information providing server 10 sets a user route, the map information providing server 10 may determine a range on the map, a base point of which is the address of the user (a range of N kilometers from the address of the user, for example), based on the travel difficulty of the subject route, and may extract a point as the end point in this range. In this way, the processing load can be reduced by narrowing down user routes corresponding to the travel difficulty of the subject route. Moreover, as described above, a required storage capacity can be reduced compared with the case where user routes are registered in advance by setting user routes after the map information providing server 10 receives the specification of the subject route.

Moreover, the example of the travel difficulty calculated for a route is not limited to the travel difficulty employed in the above-mentioned embodiment. For example, the travel difficulty of a route can be calculated as described below.

As a specific example, the travel difficulty calculation module 110 may calculate the travel difficulty of the route as a value corresponding to a travel time required for traveling on the route. On this occasion, the travel difficulty calculation module 110 may divide the route into a plurality of portions, may calculate a partial travel difficulty for each of the portions, and may calculate the travel difficulty by summing the calculated partial travel difficulties.

In this case, the travel difficulty W required for the travel from the point A to the point B illustrated in FIG. 3 may be calculated as $W=t(\theta) \cdot d$. In this expression, $\theta$ is a gradient (angle) from the point A to the point B, $t(\theta)$ is a travel time per unit distance, and d is a travel distance.

FIG. 14 is a table showing an example of values of t corresponding to the angle $\theta$. As shown in FIG. 14, a value of $t(\theta)$ may be set in advance for each of the ranges of the angle $\theta$, and a positive $\theta$ corresponds to an ascending slope, a zero $\theta$ corresponds to a flat road, and a negative $\theta$ corresponds to a descending slope. Note that, $\theta$ is determined based on $\sin \theta = \Delta H/d$.

Moreover, as another specific example of the travel difficulty, the travel difficulty calculation module 110 may calculate the travel difficulty of a route as a value corresponding to a calorie to be required for traveling on the route. On this occasion, the travel difficulty calculation module 110 may divide the route into a plurality of portions, may calculate a calorie for traveling on each of the portions, and may calculate the travel difficulty by summing the calculated calories.

In this case, the travel difficulty W required for the travel from the point A to the point B illustrated in FIG. 3 may be calculated as $W=M \cdot METS(\theta) \cdot a \cdot d/t(\theta)$. In this expression, M is a body weight, $METS(\theta)$ is a coefficient representing an intensity of a motion, a is a coefficient of a predetermined value (1.05), $\theta$ is a gradient (angle) from the point A to the point B, $t(\theta)$ is a travel time per unit distance, and d is a travel distance.

FIG. 15 is a table showing an example of values of METS corresponding to the angle $\theta$. Further, the values of the table shown in FIG. 14 may be used for $t(\theta)$. As shown in FIG. 15, a value of $METS(\theta)$ may be set in advance for each of the ranges of the angle $\theta$, and a positive $\theta$ corresponds to an ascending slope, a zero $\theta$ corresponds to a flat road, and a negative $\theta$ corresponds to a descending slope. Note that, $\theta$ is determined based on $\sin \theta = \Delta H/d$.

Moreover, as another specific example of the travel difficulty, the travel difficulty calculation module 110 may calculate the travel difficulty of a route based on the undulation of the route without 20 considering the length of the route. On this occasion, the travel difficulty calculation module 110 may calculate the travel difficult W required for the travel from the point A to the point B illustrated in FIG. 3 as $W=f(\theta)$. For example, $f(\theta)$ may be a monotonic increasing function. Moreover, the travel difficulty calculation module 110 can calculate the travel difficulty of a route based on an undulation of the route, and a projected distance of the route on a map plane. On this occasion, the travel difficulty calculation module 110 may calculate the travel difficulty W required for the travel from the point A to the point B illustrated in FIG. 3 as $W=f(\theta) \cdot d \cdot \cos(\theta)$, for example. Moreover, the travel difficulty calculation module may calculate the travel difficulty of a route based on a length determined by considering the undulation 5 of the route. On this occasion, the travel difficulty calculation module 110 may calculate the travel difficulty W required for the travel from the point A to the point B illustrated in FIG. 3 as W=d, for example.

According to the above-mentioned embodiment, the travel difficulty of a route is calculated based on the undulation of the route (and further the length of the route), but the travel difficulty may be calculated based on data such as the season, the weather, the atmospheric temperature, the humidity, presence/absence of objects existing on the route such as stairs, a railroad crossing, and a traffic light, a state of the road surface, and the like, in addition to the undulation of the route (and further the length of the route). For example, regarding the data such as the season, the weather, the atmospheric temperature, and the humidity, weather information on a region in which the subject route is located is acquired from a weather information providing server (not shown), and the values of F, t, and METS in the tables shown in FIGS. 4, 14, and 15 may be changed depending on the acquired weather information.

In the following, a description is given of a specific example in which the travel difficulty of a route is calculated based on the data such as the season, the weather, the atmospheric temperature, the humidity, presence/absence of objects existing on the route such as stairs, a railroad crossing, and a traffic light, a state of the road surface, and the like, in addition to the length and the undulation of the route.

On this occasion, a description is given of an example in which, in a case where a route is divided into a plurality of portions, a partial travel difficulty is calculated for each of the portions, the calculated partial difficulties are summed, a travel difficulty Z of a partial route from the point A to the point B corresponding to the divided portion of the route is calculated. The travel difficulty Z is represented as Z=g(W,γ) where W is a travel difficulty calculated based on the undulation of the route from the point A to the point B, and γ is a correction coefficient for the travel difficulty based on the weather and presence/absence of objects. On this occasion, the function g may be g(W,γ)=W+γ or g(W,γ)=γ·W.

First, a description is given of a case where there are objects such as stairs, railroad crossings, traffic lights, underground passages, and overpasses on the route between the point A and the point B. For example, when there are n objects Oi (i= 1, . . . , n) between the point A and the point B, Z=g(W,γ) is calculated by adding a correction value (γ1>0) proportional to a sum of loads defined for the respective objects Oi to γ (initial value of γ=0). On this occasion, for example, the travel difficulty Z from the point A to the point B may be calculated by adding γ to a parameter or the travel difficulty based on the undulation from the point A to the point B (such as Z=(F(θ)+γ)·d or Z=F(θ)·d+γ) or the travel difficulty Z from the point A to the point B may be calculated by multiplying γ by the travel difficulty based on the undulation from the point A to the point B (such as Z=γ·F(θ)·d). In this way, it is possible to reflect the types of object disposed on the route, and the state of an undulation on which the objects are disposed to the travel difficulty of the route by calculating the travel difficulty Z from the point A to the point B.

Note that, in the above-mentioned example, the travel difficulty of a route is calculated considering positions at which objects are disposed on the route, but the positions at which objects are disposed on the route may not be considered. In this case, for example, when an object is contained in the route, the travel difficulty of the route may be calculated by adding or multiplying a correction value based on a load corresponding to the object or a constant load independent of the object, to or by a travel difficulty of the route calculated without considering an influence of the object.

A description is now given of an example of the correction coefficient γ for a travel difficulty used when the weather, the atmospheric temperature, the humidity, and the like are considered as parameters. First, environmental information (reference environmental information) serving as a reference for a user is set based on a region in which the user lives (or the nationality of the user) or a region to which a reference user route belongs. On this occasion, the reference environmental information may contain information such as ranges of the atmospheric temperature and the humidity the user usually experiences, presence/absence of snowfall, and a road surface state (paved road or unpaved road (such as mountain road)). Then, it is determined whether or not subject environmental information (such as the atmospheric temperature, the humidity, the presence/absence of snowfall, and the road surface condition) based on a region and weather data of the subject route corresponds to the environment usually experienced by the user by comparing between the reference environment information of the user and the subject environmental information, and when it is determined that the subject environmental information does not correspond to the environment usually experienced, a correction value (γ2>0) may be added to γ, and when it is determined that the subject environmental information corresponds to the environment usually experienced, a correction value may not be added to γ. Note that, a calculation method for the travel difficulty Z from the point A to the point B using the correction coefficient γ may be similar to the above-mentioned method.

Moreover, in the above-mentioned example, any one of the correction value γ1 based on objects on a route and the correction value γ2 based on the weather information may be included in the correction coefficient γ (such as γ=γ1 or γ2), or both of the correction value γ1 and the correction value γ2 may be included in the correction coefficient γ (such as γ=γ1+γ2 or γ1·γ2).

Moreover, in the above-mentioned embodiment, when there is not a user route higher in travel difficulty than a subject route in user routes stored for a user, the user route may be extended, and the extended user route may be used as a reference user route. For example, a user route highest in travel difficulty may be selected out of the user routes, a difference in travel difficulty between the selected user route (user route to be subjected to extension) and the subject route may be calculated, a point located at a position which corresponds to the calculated difference in the travel difficulty from the end point of the user route to be subjected to extension may be searched for, and the user route to be subjected to extension may be extended to the retrieved point. Then, the user route to be subjected to extension extended in this way may be used as the reference user route, and may be used to compare to the subject route.

In the above-mentioned embodiment, the example in which the present invention is applied to the map information providing server 10 is described, but it is to be understood that the present invention can be applied to a stand-alone computer. When the stand-alone computer is a mobile terminal provided with a touch panel and the global positioning system (GPS) receiver, for example, the start point (departure point) on a map may be set based on location information acquired by means of the GPS, and the end point (destination) on the map may be set based on a position tapped by the user on the map displayed on the touch panel. As a result, the start point can be automatically set based on the current position, the end point can be set by the intuitive operation by the user, and labor required for the user to set the subject route from the present position to the destination can thus be reduced.

Moreover, according to the above-mentioned embodiment, the data specifying user routes is received in advance, and the user routes are registered before the subject route is determined, but the data specifying the subject route, and the data specifying the user routes may be received in the same timing, or the data specifying the user routes may be received after the data specifying the subject road is received.

Moreover, in the above-mentioned embodiment, a travel method for use when the user travels on a route may be walking (including running), riding on a bicycle, or the like, and is not specifically limited. For example, data for calculating travel difficulties for the respective travel methods may be held, respective travel difficulties of the subject route and the user route may be calculated for a travel method specified by the user, and a result of comparison between the subject route and the user route based on the calculated travel difficulties may be presented to the user.

The invention claimed is:

1. A route information providing device, comprising:
   means for storing map data including an undulation of an actual topography;
   means for storing information on first routes which are registered by a user and associated with authentication information of the user, each of the first routes containing one or more routes from a point, as a start point, corresponding to information on the user in the map data, to a plurality of predetermined points in a region containing the point corresponding to the information on the user in the map data;
   determination means for determining a second route from a different start point to an end point, the end point being different than each of the plurality of predetermined points, which are specified based on a request from the user;
   comparison means for directly or indirectly comparing a length of the second route and an undulation on the second route, and a length of each of the first routes and an undulation on each of the first routes with each other in the map data; and
   information providing means for providing the user with information on a result of the comparison that indicates labor required for traveling on the second route compared with the first routes by the comparison means.

2. The route information providing device according to claim 1, wherein the comparison means performs any comparison selected from a comparison between travel difficulties each determined based on a length of a route and an undulation on the route with each other, a comparison between lengths each obtained by correcting the length of the route based on the undulation on the route with each other, and a comparison between travel difficulties each determined based on a length obtained by correcting the length of the route based on the undulation on the route and the undulation on the route with each other.

3. The route information providing device according to claim 2, wherein the respective travel difficulties of the first route and the second route are calculated with the length of each of the first route and the second route, the undulation of each of the first route and the second route, and correction coefficient based on a load corresponding to an object existing on each of the first routes and the second route being considered as parameters.

4. The route information providing device according to claim 2, wherein the travel difficulty of the second route is calculated so as to have a larger value when it is determined that an environment of the second route is not an environment usually experienced by the user than a value calculated when it is determined that the environment of the second route is the environment usually experienced by the user.

5. The route information providing device according to claim 1,
   further comprising selection means for selecting, as a reference route, a first route closest to the second route in travel difficulty when the comparison means compares travel difficulties each determined based on a length of a route and an undulation on the route with each other, or travel difficulties each determined based on a length obtained by correcting the length of the route based on the undulation on the route and the undulation on the route with each other, or in length when the comparison means compares lengths each obtained by correcting the length of the route based on the undulation on the route with each other,
   wherein the information providing means provides the user with information on the reference route selected by the selection means as the information based on the comparison result by the comparison means.

6. The route information providing device according to claim 5, wherein the selection means selects, as the reference route, a route closest in topography, out of the plurality of first routes, when the comparison means compares the travel difficulties each obtained based on the length of the route and the undulation on the route with each other, or the travel difficulties each obtained based on the length obtained by correcting the length of the route based on the undulation on the route and the undulation on the route with each other.

7. The route information providing device according to claim 1, wherein:
   the one or more routes contained in the plurality of first routes respectively contain one or more via points; and
   the comparison means is capable of setting a via point contained in each of the first routes as an end point of the first route thereby forming a new first route.

8. The route information providing device according to claim 1, wherein the comparison means determines a correlation between curves respectively representing the first route and the second route when the comparison means directly compares the first route and the second route, and compares characteristic quantities based on topographies of the first route and the second route when the comparison means indirectly compares the first route and the second route.

9. The route information providing device of claim 1, wherein the authentication information includes an identification and a password of the user.

10. A route information providing device, comprising:
    means for storing map data including an undulation of an actual topography;
    acquisition means for acquiring information on first routes each containing one or more routes from a point, as a start point associated with authentication information of a user, to a plurality of predetermined points in a region containing the start point associated with the authentication information of the user;
    determination means for determining a second route from a different start point to an end point, the end point being different than each of the plurality of predetermined points, which are specified based on a request from the user;
    comparison means for directly or indirectly comparing a length of the second route and an undulation on the second route, and a length of each of the first routes and an undulation on each of the first routes with each other in the map data; and
    information providing means for providing the user with information on a result of the comparison that indicates labor required for traveling on the second route compared with the first routes by the comparison means.

11. The route information providing device according to claim 10, wherein the acquisition means acquires information on the first routes within a predetermined range by using the point corresponding to the information on the user as the start point and the length of the second route as a reference in finding a predetermined point.

12. A route information providing method for a route information providing device which is configured with a computer, the route information providing device comprising:
means for storing map data including an undulation of an actual topography; and
means for storing information on first routes which are registered by a user and associated with authentication information of the user, each of the first routes containing one or more routes from a point, as a start point, corresponding to information on the user in the map data, to a plurality of predetermined points in a region containing the point corresponding to the information on the user in the map data, the route information providing method comprising:
a determination step of determining, by the computer, a second route from a different start point to an end point, the end point being different than each of the plurality of predetermined points, which are specified based on a request from the user;
a comparison step of directly or indirectly comparing, by the computer, a length of the second route and an undulation on the second route, and a length of each of the first routes and an undulation on each of the first routes with each other in the map data; and
a displaying step of displaying the information on a result of the comparison that indicates labor required for traveling on the second route compared with the first routes of the comparison step at a user terminal.

13. A route information providing method for a route information providing device which is configured with a computer, the route information providing device comprising means for storing map data including an undulation of an actual topography, the route information providing method comprising:
an acquisition step of acquiring, by the computer, information on first routes which are registered by a user and associated with authentication information of the user, each of the first routes containing one or more routes from a point, as a start point, corresponding to information on the user in the map data, to a plurality of predetermined points in a region containing the point corresponding to the information on the user in the map data;
a determination step of determining, by the computer, a second route from a different start point to an end point, the end point being different than each of the plurality of predetermined points, which are specified based on a request from the user;
a comparison step of directly or indirectly comparing, by the computer, a length of the second route and an undulation on the second route, and a length of each of the first routes and an undulation on each of the first routes with each other in the map data; and
a displaying step of displaying the information on a result of the comparison that indicates labor required for traveling on the second route compared with the first routes of the comparison step at a user terminal.

14. A non-transitory information recording medium having a program for causing a computer to function as:
means for storing map data including an undulation of an actual topography; and
means for storing information on first routes which are registered by a user and associated with authentication information of the user, each of the first routes containing one or more routes from a point, as a start point, corresponding to information on the user in the map data, to a plurality of predetermined points in a region containing the point corresponding to the information on the user in the map data, and
wherein the program controls the computer to function as:
determination means for determining a second route from a different start point to an end point, the end point being different than each of the plurality of predetermined points, which are specified based on a request from the user;
comparison means for directly or indirectly comparing a length of the second route and an undulation on the second route, and a length of each of the first routes and an undulation on each of the first routes with each other in the map data; and
displaying means for displaying the information on a result of the comparison that indicates labor required for traveling on the second route compared with the first routes of the comparison means at a user terminal.

15. A non-transitory information recording medium having a program for causing a computer to function as means for storing map data including an undulation of an actual topography, and
wherein the program controls the computer to function as:
acquisition means for acquiring information on first routes which are registered by a user and associated with authentication information of the user, each of the first routes containing one or more routes from a point, as a start point, corresponding to information on the user, to a plurality of predetermined points in a region containing the point corresponding to the information on the user in the map data;
determination means for determining a second route from a different start point to an end point, the end point being different than each of the plurality of predetermined points, which are specified based on a request from the user;
comparison means for directly or indirectly comparing a length of the second route and an undulation on the second route, and a length of each of the first routes and an undulation on each of the first routes with each other in the map data; and
displaying means for displaying the information on a result of the comparison that indicates labor required for traveling on the second route compared with the first routes of the comparison means at a user terminal.

* * * * *